United States Patent
Yang et al.

(10) Patent No.: US 8,185,482 B2
(45) Date of Patent: May 22, 2012

(54) MODELING SEMANTIC AND STRUCTURE OF THREADED DISCUSSIONS

(75) Inventors: Jiang-Ming Yang, Beijing (CN); Rui Cai, Beijing (CN); Xin-Jing Wang, Beijing (CN); Lei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 533 days.

(21) Appl. No.: 12/414,598

(22) Filed: Mar. 30, 2009

(65) Prior Publication Data

US 2010/0250597 A1 Sep. 30, 2010

(51) Int. Cl.
*G06F 15/18* (2006.01)
(52) U.S. Cl. ........................................................ 706/12
(58) Field of Classification Search .................... None
See application file for complete search history.

(56) References Cited

U.S. PATENT DOCUMENTS

| | | | |
|---|---|---|---|
| 6,792,448 B1 | 9/2004 | Smith | |
| 7,437,382 B2 | 10/2008 | Zhang | |
| 7,814,048 B2 * | 10/2010 | Zhou et al. | 707/602 |
| 2005/0131916 A1 | 6/2005 | Banatwala | |
| 2006/0026593 A1 * | 2/2006 | Canning et al. | 718/100 |
| 2006/0112036 A1 * | 5/2006 | Zhang et al. | 706/20 |
| 2006/0271364 A1 | 11/2006 | Mirkovic | |
| 2006/0271625 A1 | 11/2006 | Kordun | |
| 2007/0124432 A1 * | 5/2007 | Holtzman et al. | 709/219 |
| 2008/0065608 A1 | 3/2008 | Liesche | |
| 2008/0082607 A1 * | 4/2008 | Sastry et al. | 709/204 |
| 2008/0215541 A1 | 9/2008 | Li | |
| 2008/0306959 A1 | 12/2008 | Spivack | |
| 2010/0076978 A1 * | 3/2010 | Cong et al. | 707/738 |

OTHER PUBLICATIONS

Dringus, Laurie P. et al.; "Using data mining as a strategy for assessing asynchronous discussion forums"; 2005; Elsevier Ltd; Computers & Education 45 pp. 141-160.*
Cong, Gao et al.; "Finding Question-Answer Pairs from Online Forums"; ACM; SIGIR '08; pp. 467-474.*
Strijbos, J-W., A multidimensionsal coding scheme for VMT, Computer-Supported Collaborative Learning Series, Jan. 2009, vol. 11, Part 5, pp. 399-419.
Davis, M., Rouzie, A., Cooperation vs. Deliberation: Computer mediated conferencing and the problem of argument in international distance education, The International Review of Research in Open and Distance Learning, Apr. 2002, vol. 3, No. 1.

(Continued)

*Primary Examiner* — Jeffrey A Gaffin
*Assistant Examiner* — Stanley K Hill
(74) *Attorney, Agent, or Firm* — Lyon & Harr, L.L.P.; Craig S. Fischer

(57) ABSTRACT

A simultaneous semantic and structure threaded discussion modeling system and method for generating a model of a discussion thread and using the model to mine data from the discussion thread. Embodiments of the system and method generate a model that contains both semantic terms and structure terms. The model simultaneously models both semantics and structure of the discussion thread. A model generator includes a semantic module generates two semantic terms for the model and a structure module generates two structure terms for the model. The generator combines the two semantic terms and the two structure terms to generate the simultaneous semantic and structure model. Embodiments of the system and method include an applications module, which contains three application that use the model to reconstruct reply relations among posts in the discussion thread, identify junk posts in the discussion thread, and find experts in each sub-board of web forums.

20 Claims, 10 Drawing Sheets

OTHER PUBLICATIONS

K. Balog, L. Azzopardi, De Rijke, M., A language modeling framework for expert finding, Information Processing and Management, Jun. 2008, 06(003).

Blei, D. M., Larety, J.D., Dynamic topic models, in Proc. of ICML, Jun. 2006, pp. 113-120.

Blei, D. M., NG, A.Y., Jordan, M.I., Latent dirichlet allocation, Journal of Machine Learning Research, Mar. 2003, vol. 3, pp. 993-1022.

Buntine, W., Jakulin, A., Applying discrete pca in data analysis, In Proc. of UAI, 2004, Jul. 2004, pp. 59-66.

Chemudugunta, C., Smyth, P. Steyvers, M., Modeling general and specific aspects of documents with a probabilistic topic model, Advances in neural information processing systems, 1990, 41(6), pp. 391-407.

Cong, G., Wang, L., Lin, C.-Y.M Song, Y.-I., Sun, Y., Finding question-answer pairs from online forums, In Proc. 31st SIGIR, Jul. 2008, pp. 467-474.

Ding, S., Cong, G., Lin, C.-Y., Zhu, X., Using conditional random fields to extract contexts and answers of questions from online forums, In Proc. 11th ACL, Jun. 2008, pp. 710-718.

Gu, X., MA, W.-Y., Building implicit links from content for forum search, In Proc. 29th SIGIR, Aug. 2006, pp. 300-307.

Hofmann, T., Probabilistic latent semantic indexing, In Proc. 22nd SIGIR, Aug. 1999, pp. 50-57.

Huang, J., Zhou, M., Yang, D., Extracting chatbot knowledge from online discussion forums, In Proc. 11th IJCAI, Mar. 2006 pp. 423-428.

Kim, J. W., Candan, K. S., Donderler, M. E., Topic segmentation of message hierarchies for indexing and navigation support, In Proc. 16th WWW, May 2005, pp. 322-331.

Kleinberg, J., Authoritative sources in a hyperlinked environment, J. ACM, Sep. 1999, 46(5), pp. 604-622.

McCallum, A., Corrada-Emmanuel, A., Wang, X., Topic and role discovery in social networks, In Proc. of IJCAI, Jan. 2007, pp. 249-272.

Page, L., Brin, S., Motwani, R., Winograd, T., The pagerank citation ranking: Bringing order to the web, Jan. 1998, Technical report. Stanford University.

Phan, X.-H., Nguyen, L.-M., Horiguchi, S., Learning to classify short and sparse text & web with hidden topics from large-scale data collections, In Proc. of WWW, Apr. 2008, pp. 91-100.

Rosen-Zvi, M., Griffiths, T., Steyvers, M., Smyth, P., The author-topic model for authors and documents, In Proc. of UAI, Jul. 2004, pp. 487-494.

Shen, D., Yang, Q., Sun, J.-T., Chen, Z., Thread detection in dynamic text message streams, In Proc. 29th SIGIR, Aug. 2006, pp. 35-42.

Song, X., Tseng, B. L., Lin, C.-Y., Sun, M.-T., Personalized recommendation driven by information flow, In Proc. 29th SIGIR, Aug. 2006, pp. 509-516.

Wang, C., Blei, D. M., Heckerman, D., Continuous time dynamic topic models, In Proc. of UAI, Jul. 2008, pp. 579-586.

Zhang, J., Ackerman, M. S., Adamic, L., Expertise networks in online communities: structure and algorithms, In Proc. of WWW, May 2007, pp. 221-230.

\* cited by examiner

| Slashdot Inside Intel's $20M Multicore Research Program |

AN ANONYMOUS READER WRITES "YOU MAY HAVE HEARD ABOUT INTEL'S AND MICROSOFT'S EFFORTS TO FINALLY GET MULTI-CORE PROGRAMMING INTO GEAR SO THAT THERE ACTUALLY WILL BE A DEVELOPER WHO CAN ⟵ 800 PROGRAM ALL THESE FANCY NEW MULTICORE PROCESSORS, WHICH MAY HAVE DOZENS OF CORE ON ONE CHIP WITHIN A FEW YEARS. TG DAILY HAS AN INTERESTING ARTICLE ABOUT THE PROJECT, WRITTEN BY ONE OF THE RESEARCHERS. IT LOOKS LIKE THERE IS A LOT OF EXCITEMENT AROUND THE OPPORTUNITY TO CREATE A NEW GENERATION OF DEVELOPMENT TOOLS . . .

> It's easy (Score:5)
> ./CONFIGURE --NUM-CORES=16
>> Re:It's easy (Score:0)
>> ACTUALLY IT'S ALMOST AS SIMPLE AS THAT IF YOU USE OPENMP. YOU JUST THROW IN SOME PRAGMA TAGS AND ADD AN OPTION TO GCC OR SOME OTHER COMPATIBLE COMPILER. SOMEONE (INTEL?) ALSO HAS A MULTICORE DEBUGGER SUPPOSEDLY.
>
> Numba One! (Score:-1)
> OHHHHH YEAHHH.
>> Re:Numba One! (Score:0)
>> FAIL.
>
> Most PC's are fast enough (Score:3)
> THE THING IS, MOST PC'S HAVE PLENTY OF COMPUTING POWER AS A SINGLE CORE SYSTEM. THE HARD SELL IS GETTING PEOPLE TO UPGRADE THOSE MACHINES MAINLY USED FOR EMAIL AND BROWSING AND VIDEO PLAYBACK. I THINK AS TIME MOVES ON AND QUAD CORE BECOMES THE "LOW-END" YOU WILL SEE LESS DEMAND FOR HIGHER END HARDWARE. UNLESS THE NEXT VERSION OF WINDOWS REQUIRES A CORE DEDICATED TO THE OR SOMETHING IN THE FUTURE.
>> Re:Most PC's are fast enough (Score:1)
>> I THINK THE CURRENT GENERATION OF WINDOWS (VISTA) PRETTY MUCH DOES NEED ITS OWN CORE TO RUN WELL.
>> Re:Most PC's are fast enough (Score:5)
>> SO, UH, YOU HAVEN'T VISTA YET, I SEE . . .
>> Re:Most PC's are fast enough (Score:2)
>> I WISH I COULD COUNT THE NUMBER OF TIMES I'VE HEARD VARIATIONS OF THIS. I THINK THE FIRST TIME I HEARD IT WAS WHEN INTEL RELEASED THE 80387. DIDN'T SEEM TO BE ACCURATE THEN EITHER. PRETTY SOON SOCIAL NETWORKING WILL INCLUDE 1080P VIDEO MAIL OR 50 MEGAPIXEL PHOTOS OF JR. OR THERE WILL BE ANOTHER DOOM II OR SOMETHING LIKE THAT GOLF GAME THAT HAD EVERY EXECUTIVE UPGRADING THEIR WINDOWS 95 'BUSINESS' COMPUTERS. . .
>> Re:Most PC's are fast enough (Score:-1)
>> NO ONE WILL EVER NEED MORE THE 640K

FIG. 8

> Slashdot Inside Intel's $20M Multicore Research Program
>
> AN ANONYMOUS READER WRITES "YOU MAY HAVE HEARD ABOUT INTEL'S AND MICROSOFT'S EFFORTS TO FINALLY GET MULTI-CORE PROGRAMMING INTO GEAR SO THAT THERE ACTUALLY WILL BE A DEVELOPER WHO CAN PROGRAM ALL THESE FANCY NEW MULTICORE PROCESSORS, WHICH MAY HAVE DOZENS OF CORE ON ONE CHIP WITHIN A FEW YEARS. TG DAILY HAS AN INTERESTING ARTICLE ABOUT THE PROJECT, WRITTEN BY ONE OF THE RESEARCHERS. IT LOOKS LIKE THERE IS A LOT OF EXCITEMENT AROUND THE OPPORTUNITY TO CREATE A NEW GENERATION OF DEVELOPMENT TOOLS . . .
>
> — 900
>
> > It's easy
> >
> > ./CONFIGURE –NUM-CORES=16
> >
> > Re:It's easy
> >
> > ACTUALLY IT'S ALMOST AS SIMPLE AS THAT IF YOU USE OPENMP. YOU JUST THROW IN SOME PRAGMA TAGS AND ADD AN OPTION TO GCC OR SOME OTHER COMPATIBLE COMPILER. SOMEONE (INTEL?) ALSO HAS A MULTICORE DEBUGGER SUPPOSEDLY.
> >
> > Numba One!
> >
> > OHHHHH YEAHHH.
> >
> > Re:Numba One!
> >
> > FAIL.
> >
> > Most PC's are fast enough
> >
> > THE THING IS, MOST PC'S HAVE PLENTY OF COMPUTING POWER AS A SINGLE CORE SYSTEM. THE HARD SELL IS GETTING PEOPLE TO UPGRADE THOSE MACHINES MAINLY USED FOR EMAIL AND BROWSING AND VIDEO PLAYBACK. I THINK AS TIME MOVES ON AND QUAD CORE BECOMES THE "LOW-END" YOU WILL SEE LESS DEMAND FOR HIGHER END HARDWARE. UNLESS THE NEXT VERSION OF WINDOWS REQUIRES A CORE DEDICATED TO THE OR SOMETHING IN THE FUTURE.
> >
> > > Re:Most PC's are fast enough
> > >
> > > I THINK THE CURRENT GENERATION OF WINDOWS (VISTA) PRETTY MUCH DOES NEED ITS OWN CORE TO RUN WELL.
> > >
> > > Re:Most PC's are fast enough
> > >
> > > SO, UH, YOU HAVEN'T VISTA YET, I SEE . . .
> > >
> > > Re:Most PC's are fast enough
> > >
> > > I WISH I COULD COUNT THE NUMBER OF TIMES I'VE HEARD VARIATIONS OF THIS. I THINK THE FIRST TIME I HEARD IT WAS WHEN INTEL RELEASED THE 80387. DIDN'T SEEM TO BE ACCURATE THEN EITHER. PRETTY SOON SOCIAL NETWORKING WILL INCLUDE 1080P VIDEO MAIL OR 50 MEGAPIXEL PHOTOS OF JR. OR THERE WILL BE ANOTHER DOOM II OR SOMETHING LIKE THAT GOLF GAME THAT HAD EVERY EXECUTIVE UPGRADING THEIR WINDOWS 95 'BUSINESS' COMPUTERS. . .
> > >
> > > Re:Most PC's are fast enough
> > >
> > > NO ONE WILL EVER NEED MORE THE 640K

FIG. 9

MODELING SEMANTIC AND STRUCTURE OF THREADED DISCUSSIONS

BACKGROUND

Threaded discussions are a popular option for web users to exchange opinions and share knowledge. These threaded discussions include thousands of web forum sites, mailing lists, chat rooms, blogs, instant messaging groups, and so forth. A threaded discussion is a tool to facilitate collaborative content contributions. With millions of users contributing to these threaded discussions, the result is a vast accumulation of highly valuable knowledge and information on a variety of topics. These topics include recreation, sports, games, computers, art, society, science, home, health, and especially topics related to our daily lives which are rarely seen in traditional web pages.

As a result of the popularity of threaded discussions, there have been increased research efforts on mining information from online discussion threads. A discussion thread usually originates from a root post by a thread starter. FIG. 1 is an example of the semantic and structure of a typical threaded discussion. In particular, note that in FIG. 1 a threaded discussion 100 contains seven posts. The first post 110 is a piece of news about the release of "SilverLight 2.0 version." Some users comment on this post, such as in the second post 115 and the third post 120, which are about the "update time." Some users have further questions and initiate sub-discussions, such as in the fifth post 125, the sixth post 130, and the seventh post 135, which are about "Javascript communication." As shown in FIG. 1, others troll or complain in some posts, such as in the fourth post 140.

As more users join in the threaded discussion and make comments, the discussion thread grows. This forms a nested dialogue structure 150 that can be seen in the left side of FIG. 1. Furthermore, threaded discussion 100 exhibits rich complexity in the semantics (or topics) 160. Since users typically respond to others, previous posts affect later posts and cause the topic drift in a discussion thread. In particular, as shown in the right side of FIG. 1, the topic has drifted from a first topic ("Silverlight 1.0") 165 to a second topic ("junk") 170 to a third topic ("Javascript") 175.

Mining discussion threads is a challenging problem. One reason it is so difficult is that posts in a discussion thread are temporally dependent upon each other. A newcomer to the discussion may read some of the previous messages before posting. Replies indicate sharing of topics and vice versa. Thus, by nature a post is a mixture and mutation of previous posts. Unfortunately, such specific orderings and intra-dependencies of posts in a single thread are neglected by most existing research methods. Another reason it is so difficult to mine discussion threads is that while discussion threads are designed to encourage content distribution and contribution, they sometimes become targets of spammers. Meanwhile, some messages contain no useful information or are casual chitchat and thus are needless to analyze. Posts of useless information, spam, or chitchat are regarded as junk posts. Junk posts are useless and may disturb content analysis. A third reason mining discussion threads is challenging is that it is very hard to estimate the quality of a post. Generally, some valuable posts are long and some meaningless posts are short. However, this does not always hold true. There is a remarkable amount of long meaningless posts that are not meant to help others, while there are some short insightful posts that inspire a great deal of people. Thus measurements solely based on content length or content relevance usually do not work.

Although previous research efforts have made progress in many information retrieval scenarios, few of them are suitable for mining online discussion threads. Current work in mining discussion threads generally can be classified into two categories: (1) semantics-based techniques; and, linking structure-based techniques.

Many techniques exist that use semantic models for discussion thread analysis. One class of techniques is probabilistic topic models. Their main idea is to project documents to some latent topic space. However, most topic models assume documents in one collection to be exchangeable. In other words, their probabilities are invariant to permutation. This is contrary to the reply relationships among posts. Another class of techniques decomposes documents into a small number of topics which are distributions over words. In one such technique, each document is produced by choosing a distribution over topics, with a Dirichlet prior, and each word is sampled from a multinomial of topic-word association. Some work has been proposed to extend these techniques to model multiple relationships, such as authorship and email. Other techniques attempt to model the background, topic, and document specific words simultaneously. Some recent techniques model time dependency among documents, such as modeling the dependency in discrete time periods while considering time to be continuous. However, these models only consider the topic drift within two adjacent time periods, which is not suitable for the hierarchical intra-dependency of posts in a single discussion thread. In general, the main drawback of using semantic models for discussion thread analysis is that they only capture the semantic information but ignore the temporal structural information.

There also are several techniques that use structure models for discussion thread analysis. These techniques attempt to identify the importance of content of each document. The structure model is generally a collection of documents and linkages between them are constructed as a graph. The nodal importance or nodal quality can be estimated by the structural centrality of the nodes in the graph, where the importance refers to authority, popularity, expertise or impact in various applications. Some of these techniques are carried out in an iterative manner, propagating the authority and hub of one node to another. One such technique uses a damping factor to simulate the random walks of a surfer who is continuously jumping from one web-page to another linked page with a uniform probability. Although structural models have been applied with remarkable success in different domains, it is not suitable to analyze threaded discussions. This is because these works rely highly on the link structure among documents, while there is usually no explicit link structure among the posts in a discussion thread.

The semantics and structure of a threaded discussion are highly dependent on each other. In particular, when semantics evolves the dialogue structure changes, and vice versa. This is the nature of discussion threads. Most previous research efforts can not solve this problem directly as they are solely from the semantic-centric view or from the structure-centric view. There is little previous work in mining threaded discussions using semantic model and structure models simultaneously. The closest techniques to modeling semantic and structure simultaneously merely implement the semantic decomposition and structure reconstruction in two phases. However, this which conflicts with the above discussion that structure in discussion threads usually changes along with semantics. Consequently, the reconstructed structure generated by these techniques is not consistent with the evolving nature of semantics in threaded discussions.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the simultaneous semantic and structure threaded discussion modeling system and method include generating a model of a discussion thread and using the model to mine data from the discussion thread. The model generated simultaneously models semantic and structure of the discussion thread. This simultaneous semantic and structure model can be used to reconstruct reply relations among posts in the discussion thread, identify junk posts in the discussion thread, and find experts in each sub-board of web forums.

Embodiments of the simultaneous semantic and structure threaded discussion modeling system and method include a simultaneous semantic and structure model generator, for generating the simultaneous semantic and structure model, and an application module, which includes three applications that use the model. The simultaneous semantic and structure model generator includes a semantic module, which generates the semantic terms of the model, and a structure module, which generates the structure terms of the model.

The semantic module generates two semantic terms for the model. A topic reconstruction module generates a first semantic term. This first semantic term mathematically represents that a post in a discussion thread is a combination of several topics, where each topic contains several words. The semantic module also includes a post sparse regularizer module, which generates a second semantic term. This second semantic term uses a semantic sparse constraint to mathematically represent that a post may be only related to a limited topic, while the coefficients of other topics become zero.

The structure module generates two structure terms for the model. A sparse reply relations module generates a first structure term. This first structure term mathematically represents that if a post replies to some previous posts, then the topic of a current post can be similar to a combination of topics of previous posts. The structure module also includes a post relation module, which generates a second structure term. This second structure term uses a structure sparse constraint to mathematically represent that a post may be only related to a limited previous post while the coefficients of other posts become zero.

The generator then combines the first semantic term, the second semantic term, the first structure term, and the second structure term to generate the simultaneous semantic and structure model. The model is able to simultaneously model both the semantic and structure of the discussion thread. In some embodiments the model generated by linearly combining each of the terms.

The applications module includes a reply reconstruction module. The reply reconstruction module uses the simultaneous semantic and structure model to reconstruct reply relationships among posts based on both their estimated semantics and structures. The output of the reply reconstruction module is a reconstructed reply structure. The application module also includes a junk identification module. The junk identification module uses the model to identify which posts in the discussion thread are junk posts. The applications module also includes an expert finding module. The expert finding module finds experts in each sub-board of web forums and generates a list of those authors that are identified as experts.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

FIG. 8 is an illustration of an exemplary example of an original reply structure of a sample thread.

FIG. 9 illustrates a reconstructed reply structure after processing of the original reply structure shown in FIG. 8 by the simultaneous semantic and structure threaded discussion modeling system and method.

DETAILED DESCRIPTION

In the following description of embodiments of the simultaneous semantic and structure threaded discussion modeling system and method reference is made to the accompanying drawings, which form a part thereof, and in which is shown by way of illustration a specific example whereby embodiments of the simultaneous semantic and structure threaded discussion modeling system and method may be practiced. It is to be understood that other embodiments may be utilized and structural changes may be made without departing from the scope of the claimed subject matter.

I. DEFINITIONS

Preparatory to discussing embodiments of the simultaneous semantic and structure threaded discussion modeling system and method, it is instructive to formally define the terms "post" and "discussion thread."

I.A. Definition of "Post"

A "post" is defined as a user-submitted content at a particular time stamp. Posts are contained in threads, where they appear as boxes one after another. If a post is not the first of the corresponding thread, it is referred as a reply.

I.B. Definition of "Discussion Thread"

A "discussion thread" (or "thread") is a series of posts, usually displayed by default from the oldest thread to the latest thread. A thread is initiated by a root post, which may contain news, questions, opinions, and so forth. The thread is followed by a number of non-root posts. A post other than the root one replies to one of its previous posts in the same thread.

II. SYSTEM OVERVIEW

Figure 2:
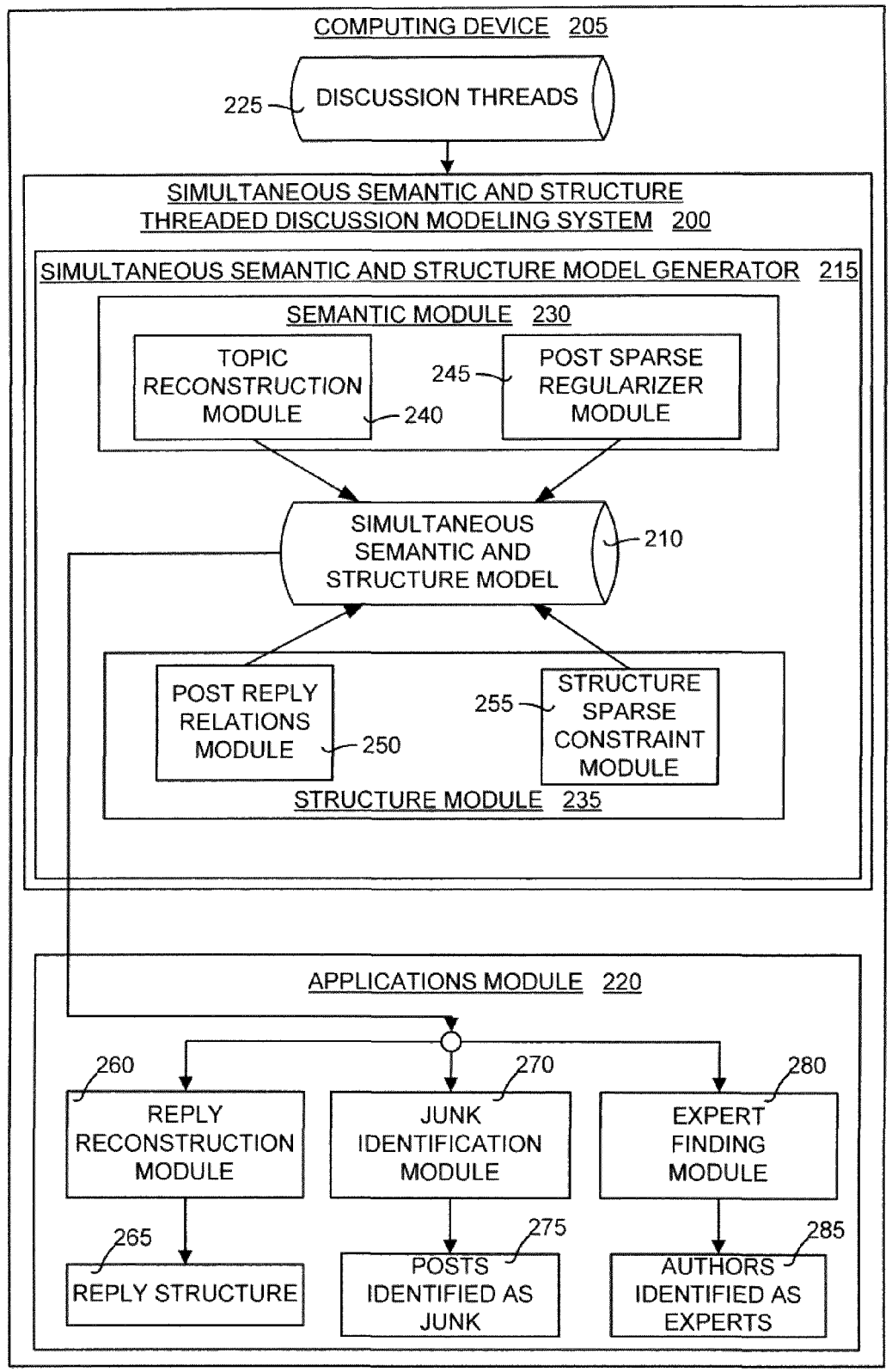
FIG. 2 is a block diagram illustrating a general overview of embodiments of the simultaneous semantic and structure threaded discussion modeling system and method disclosed herein.

FIG. 2 is a block diagram illustrating a general overview of embodiments of the simultaneous semantic and structure threaded discussion modeling system and method disclosed herein. It should be noted that the implementation shown in FIG. 2 is only one of many implementations that are possible. Referring to FIG. 2, a simultaneous semantic and structure threaded discussion modeling system 200 is shown implemented on a computing device 205. It should be noted that the computing device 205 may include a single processor (such as a desktop or laptop computer) or several processors and computers connected (either physically or wirelessly) to each other.

In general, embodiments of the simultaneous semantic and structure threaded discussion modeling system 200 generate a simultaneous semantic and structure model 210 and use that model 200 in any one of various applications. Embodiments of the simultaneous semantic and structure threaded discussion modeling system 200 include a simultaneous semantic and structure model generator 215 and an applications module 220.

Embodiments of the simultaneous semantic and structure threaded discussion modeling system 200 take an input a plurality of discussion threads 225. The discussion threads 225 are used by the simultaneous semantic and structure model generator 215 to generate the simultaneous semantic and structure model 210. In particular, the simultaneous semantic and structure model generator 215 includes a semantic module 230, for modeling the semantic terms of the model 210, and a structure module 235, for modeling the structure terms of the model 210.

The discussion threads 225 are processed by the semantic module 230. The semantic module 230 includes a topic reconstruction module 240 and a post sparse regularizer module 245. The topic reconstruction module 240 generates a first semantic term of the model 210, while the post sparse regularizer module 245 generates a second semantic term of the model 210.

The discussion threads 225 also are processed by the structure module 235. Note that the discussion threads 225 are processed by the semantic module 230 and the structure module 235 simultaneously. The structure module 235 includes a post reply relations module 250 and a structure sparse constraint module 255. The post reply relations module 250 generates a first structure term of the model 210 and the structure sparse constraint module 255 generates a second structure term of the model 210. Once each of the terms have been generated, the first semantic term, second semantic term, first structure term, and second structure term are combined to generate the simultaneous semantic and structure model 210. In some embodiments, the terms are linearly combined to generate the model 210.

The simultaneous semantic and structure model 210 then is used by the applications module 220. The applications module 220 includes three applications that use the model 210. A first application is a reply reconstruction module 260. The reply reconstruction module 260 uses the model 210 to generate a reply structure 265 using the model 210 and the discussion threads 225. A second application is a junk identification module 270. The junk identification module 270 identifies junk posts and generates posts that are identified as junk 275. A third application is an expert finding module 280. The expert finding module 280 find experts in each sub-board of web forums and generates a list of those authors that are identified as experts 285. It should be noted that one or more applications from the applications module 220 may be used, such that a variety of data may be output from the system 200. Moreover, it is also possible that only the simultaneous semantic and structure model 210 may be output from the system 200, for use by applications other than those contained in the applications module 220.

III. OPERATIONAL OVERVIEW

Figure 3:
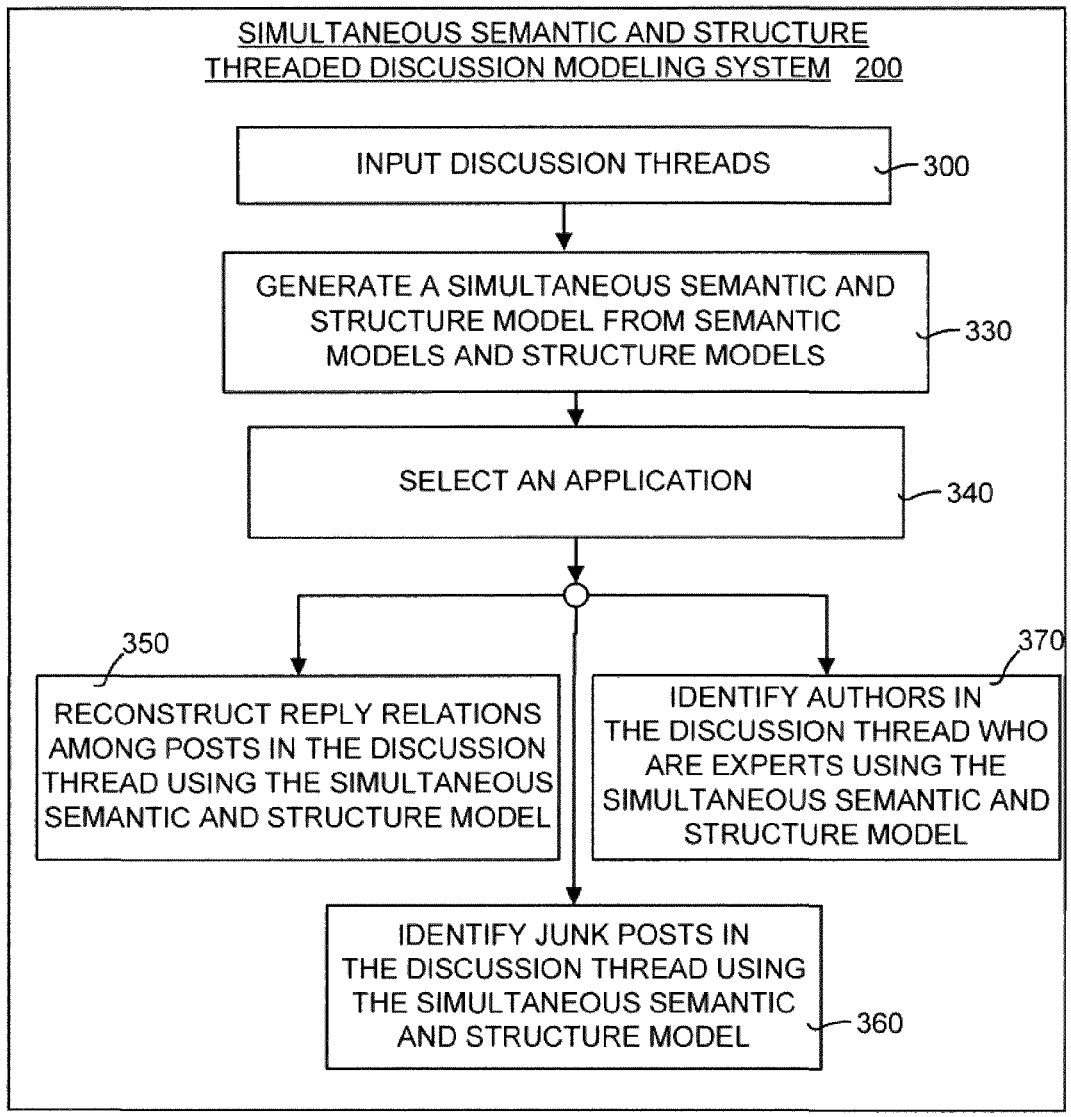
FIG. 3 is a flow diagram illustrating the operation of embodiments of the simultaneous semantic and structure threaded discussion modeling system 200 and method shown in FIG. 2.

FIG. 3 is a flow diagram illustrating the operation of embodiments of the simultaneous semantic and structure threaded discussion modeling system 200 and method shown in FIG. 2. In general, the method generates the simultaneous semantic and structure model 210 and uses the model 210 in one or more of a variety of applications. Referring to FIG. 3, the method begins by inputting the discussion threads (box 300). The data in discussion threads are treated as the conditions in model 210. The system 200 then generates the simultaneous semantic and structure model 210 from semantic models and structure models (box 330). The output values of the model 210 contain the topic reconstruction information and reply relations information for each post.

An application then is selected (box 340). If a first application is selected, then the system 200 reconstructs reply relations among posts in the discussion thread using the simultaneous semantic and structure model 210 (box 350). If a second application is selected, then the system 200 identifies junk posts in the discussion thread using the simultaneous semantic and structure model 210 (box 360). And if a third application is selected, then the system 200 identifies authors in the discussion thread who are experts by using the simultaneous semantic and structure model 210 (box 370).

IV. OPERATIONAL DETAILS

The operational details of embodiments of the simultaneous semantic and structure threaded discussion modeling system 200 and method now will be discussed. Embodiments of the simultaneous semantic and structure threaded discussion modeling system 200 and method include several program modules, as shown in FIG. 2. The operational details of each of these programs modules now will be discussed in detail.

IV.A. Simultaneous Semantic and Structure Model Generator

The simultaneous semantic and structure model generator 215 uses a variety of modules to generate the simultaneous semantic and structure model 210. The generator 215 generates semantic terms and structure terms. In some embodiments, the semantic terms include two semantic terms. A first semantic term mathematically represents a post in a discussion thread as a combination of several topics, where each topic contains several words. A second semantic term uses a semantic sparse constraint to mathematically represent that a post may be only related to a limited topic, while the coefficients of other topics become zero.

In some embodiments, the structure terms include two structure terms. A first structure term mathematically represents that if a post replies to some previous posts, then the topic of a current post can be similar to a combination of topics of previous posts. Moreover, a second structure term uses a structure sparse constraint to mathematically represent that a post may be only related to a limited previous post while the coefficients of other posts become zero.

The model 210 processes several discussion threads, which are input data. These input data are similar to the conditions in equality. The semantic information (such as the first semantic term and the second semantic term) and structure information (such as the first structure term and the second structure term) are similar to the unknown numbers in equations. In some embodiments, the equality contains four parts, which is corresponding to the four terms in the model 210. The techniques described below are used to find the values to these unknown numbers. The values to the unknown number of the four parts are each indivisible. In other words, the corresponding values need to be found simultaneously.

The generator 215 then combines the first semantic term, the second semantic term, the first structure term, and the second structure term to generate the simultaneous semantic and structure model 210. This model 210 simultaneously models both the semantic and structure of the discussion thread. The output of the generator is the simultaneous semantic and structure model 210.

IV.A.1 Semantic Module

In general, the generator 215 includes a semantic module 230 and a structure module 235. The semantic module 230 generates the semantic terms of the model 210. The semantic module 230 includes a topic reconstruction module 240 and a post sparse regularizer module 245.

IV.A.1a Topic Reconstruction Module

Figure 1:
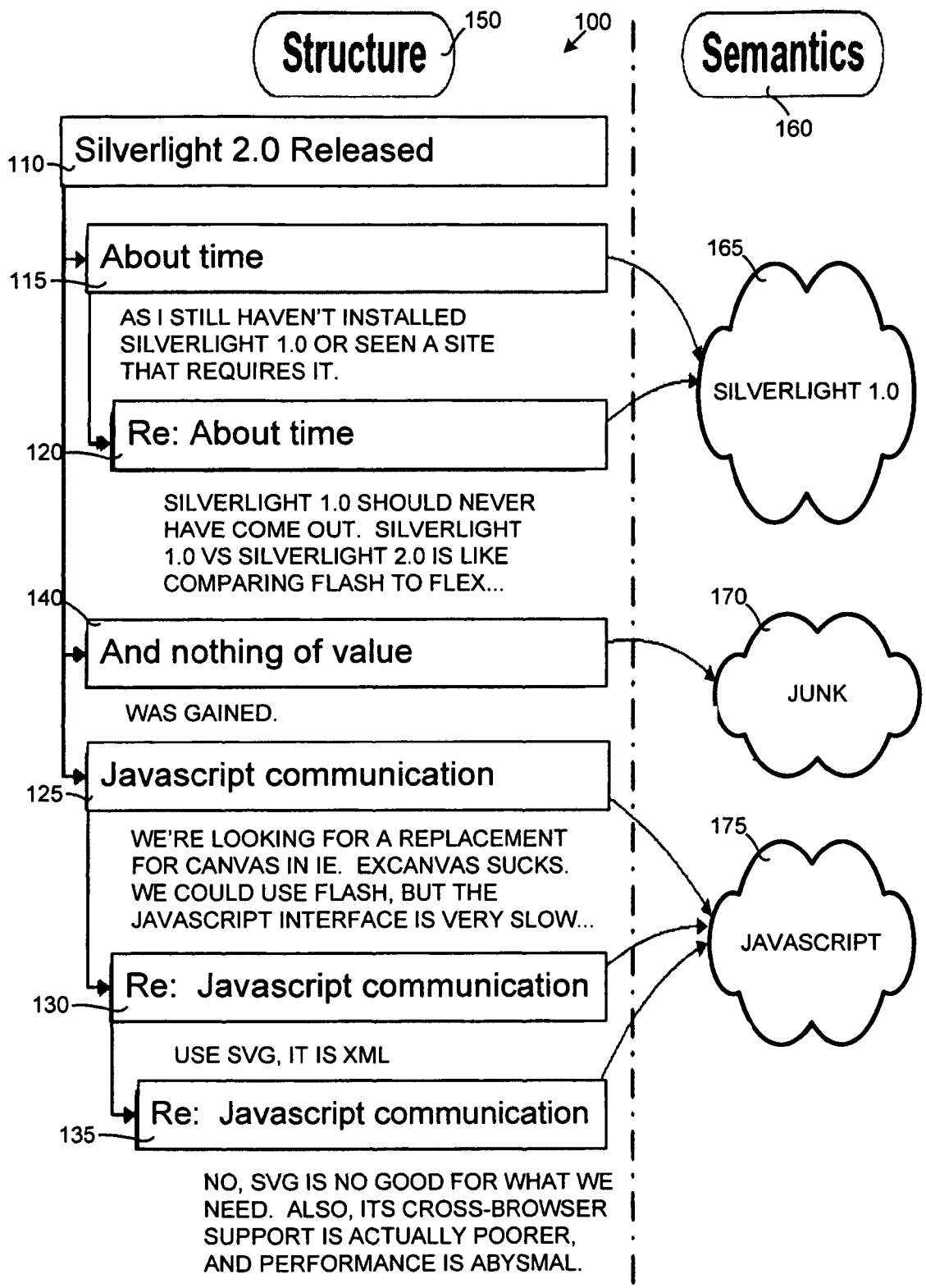
FIG. 1 is an example of the semantic and structure of a typical threaded discussion.

A discussion thread has several topics. Referring to FIG. 1, the threaded discussion 100 mainly discusses two topics, namely Silverlight 1.0 topic 165 and Javascript topic 175. Accordingly, it is desirable to find a semantic representation of each post. Such a representation demonstrates a mixture of topics in the post.

Mathematically, suppose there are T topics and V words. The $j^{th}$ topic can be described as a distribution in the word space $\mathbb{R}^V$ as $$\vec{x}^{(j)} \in \mathbb{R}^V,$$

where, $$1 \leq j \leq T.$$

The $i^{th}$ post $\vec{d}^{(i)}$ is assumed to be a mixture of various topics. Mathematically, this can be represented by the equation:

$$\vec{d}^{(i)} \simeq \sum_{j=1}^{T} \vec{\theta}_j^{(i)} \cdot \vec{x}^{(j)}$$

where $\vec{\theta}_j^{(i)}$ is the coefficient of post $\vec{d}^{(i)}$ on topic $\vec{x}^{(j)}$. To estimate the topic space, $$X = \{\vec{x}^{(1)}, \ldots, \vec{x}^{(T)}\},$$

a loss function can be minimized. The loss function is given by:

$$\|D - X\Theta\|_F^2.$$

Here the thread contains L posts as $$D = \{\vec{d}^{(1)}, \ldots, \vec{d}^{(L)}\},$$

and the coefficient matrix, $$\Theta = \{\vec{\theta}^{(1)}, \ldots, \vec{\theta}^{(L)}\}.$$

IV.A.1.b. Post Sparse Regularizer Module

An individual post is related to a few topics. Although one thread may contain several semantic topics, each individual post usually concentrates on a limited number of topics. For example, referring to FIG. 1, the second post 115 and the third post 120 are only related to the Silverlight 1.0 topic 165. Thus, it may be assumed that the coefficient vector for each post is very sparse. Mathematically, an L1 sparse regularizer is introduced, and given by, $$\|\vec{\theta}^{(i)}\|_1$$

IV.A.2 Structure Module

In general, the generator 215 includes a semantic module 230 and a structure module 235. The structure module 235 generates the structure terms of the model 210. The structure module 235 includes a post reply relations module 250 and a structure sparse constraint module 255.

IV.A.2.a. Post Relation Module

A post is related to its previous posts. When a user joins a thread, the user usually reads the existing posts in the thread. If the user is interested in some previous posts, the user may write down those comments. Thus, the semantics of the reply post is related to its previous posts, which reflects the structural characteristics of a thread.

By way of example, in FIG. 1 the seventh post 135 is related to both the fifth post 125 and the sixth post 130. Such a structural constraint can be formally represented as a regularizer given by the equation:

$$\left\|\vec{\theta}^{(i)} - \sum_{k=1}^{i-1} \vec{b}_k^{(i)} \cdot \vec{\theta}^{(k)}\right\|_F^2,$$

where $\vec{b}_k^{(i)}$ is the structural coefficient between the $i^{th}$ post and the $k^{th}$ post. Moreover, this equation shows how the $k^{th}$ post affects the $i^{th}$ post. The fact that $\vec{\theta}^{(i)}$ corresponds to the post $\vec{d}^{(i)}$ can be approximated by a linear combination of $\vec{\theta}^{(k)}$ in previous posts.

IV.A.2.b. Sparse Reply Relations Module

The reply relations are sparse. Note that in real scenarios, users usually intend to comment on one or two previous posts. For example, referring to FIG. 1, although there are many posts before the sixth post 130, it is only related to the fifth post 125. In order to model this behavior, an L1 regularizer is again introduced to favor sparse structural coefficients. This regularizer is given by the equation:

$$\|\vec{b}^{(i)}\|_1.$$

IV.A.3. Simultaneous Semantic and Structure Model

Based on the above four modules, description, a simultaneous semantic and structure model is defined as follows. Given the post matrix D, topic number T, the goal of thread modeling is to estimate the value of the topic matrix X, the coefficient matrix Θ, and the structural coefficients b of each post, by minimizing the following loss function f;

$$f = \|D - X\Theta\|_F^2 + \lambda_1 \sum_{i=1}^{L} \|\vec{\theta}^{(i)}\|_1 + \lambda_2 \sum_{i=1}^{L} \left\|\vec{\theta}^{(i)} - \sum_{k=1}^{i-1} b_k^{(i)} \cdot \vec{\theta}^{(k)}\right\|_F^2 + \lambda_3 \sum_{i=1}^{L} \|\vec{b}^{(i)}\|_1 \quad (1)$$

In equation (1), the first term is the first semantic term, which encourages the post to be reconstructed well from topics. The second term of equation (1) is the second semantic term, which constrains the topic representation to be sparse for each post. The third term is the first structure term, which encourages the post to be approximated from previous posts within the same thread. The fourth term of equation (1) is the second structure term, which is a constraint that states the structural coefficients also be sparse. The optimization objective balances the four terms by parameters $\lambda_1$, $\lambda_2$, and $\lambda_3$. In this way, equation (1) estimates both the semantic and the structural information simultaneously.

Figure 4:
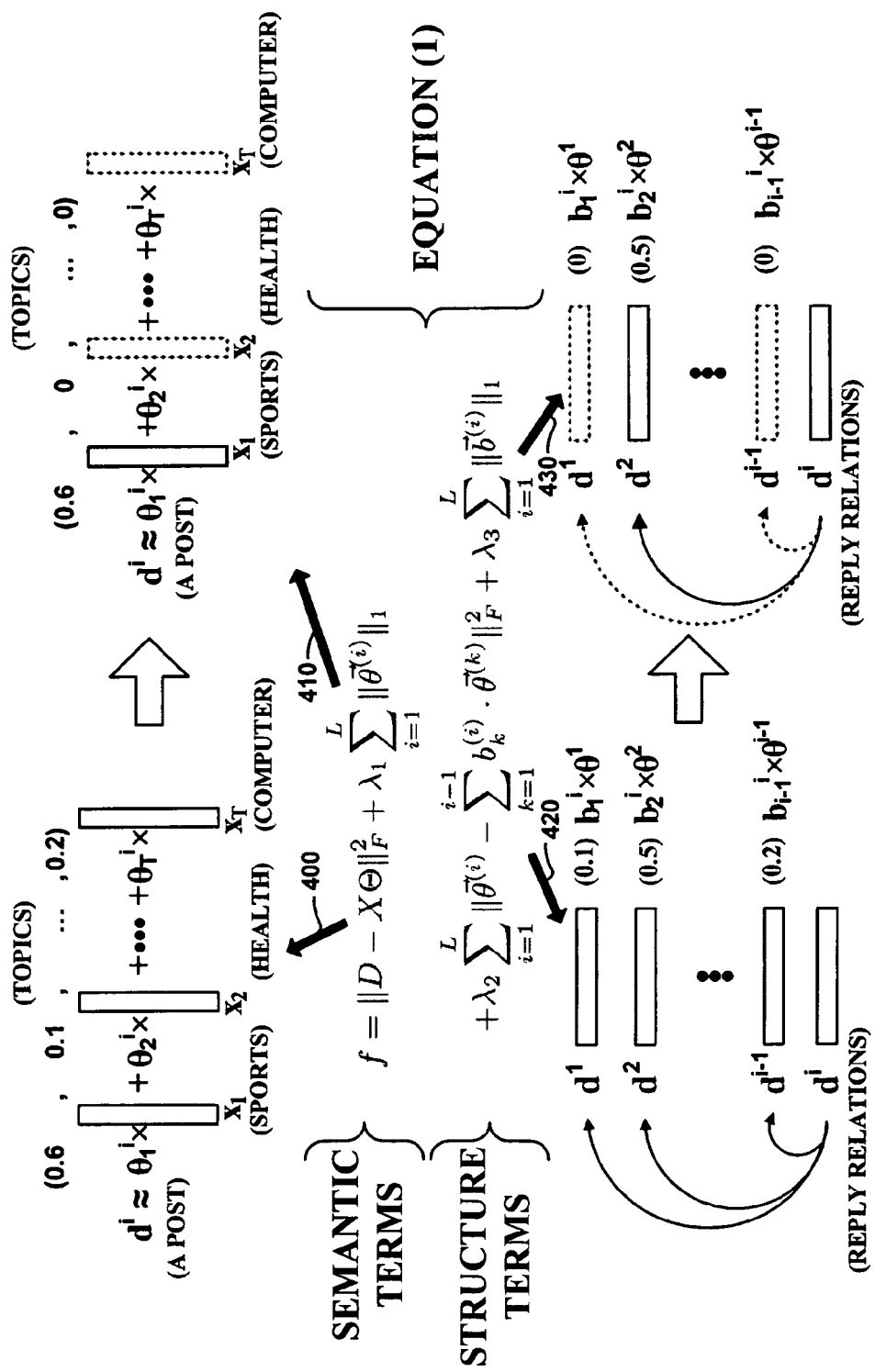
FIG. 4 is a diagram that explains in detail each of the four terms of the simultaneous semantic and structure model of FIG. 2.

FIG. 4 is a diagram that explains in detail each of the four terms of the simultaneous semantic and structure model 210 of FIG. 2, and given in some embodiments of the model 210 by equation (1) above. As shown in FIG. 4, the top part of equation (1) contains the semantic terms, while the lower part of equation (1) in FIG. 4 contains the structure terms.

The first term of equation (1), in the top left part of FIG. 4, is shown by a first arrow 400. This is the first semantic term of the model 210. This first semantic term means that a post can be represented as a combination of several topics. The rectangle of each topic X is meant to represent that each topic contains several words. Moreover, theta (θ) is the coefficient of post to the topics.

The second term of equation (1), in the top right part of FIG. 4, is shown by a second arrow 410. This is the second semantic term of the model 210. This second semantic term makes use of a sparse constraints With the sparse constraint a post may be only related to limited topic while the coefficients theta (θ) of other topics becomes zero.

The third term of equation (1), shown in the bottom left part of FIG. 4, is shown by a third arrow 420. This is the first structure term of the model 210. If a post replies to some previous posts, the topic (given by $\theta_i$) of current post can be similar to the combination of topics ($\theta_1$ to $\theta_{i-1}$) of previous posts. Note that the b of the first structure term is coefficients of a post's similarity to previous posts.

The fourth term of equation (1), shown in the bottom right part of FIG. 4, is shown by a fourth arrow 430. This is the second structure term of the model 210. With the sparse constraint, a post may be only related to limited previous posts. In addition, the coefficients b of other posts become zero.

Suppose there is a collection of M threads which share the same topic matrix X. The threads can be optimized together by minimizing the loss functions over all the threads to obtain a globally optimal topic representation and structural coefficients as follows:

$$\underset{X, \{\Theta^{(n)}\}, \{\vec{b}^{(i)(n)}\}}{\text{minimize}} \sum_{n=1}^{M} f^{(n)}(\cdot) \quad (2)$$

Although the optimization problem is not jointly convex, it can still be solved by iteratively minimizing the convex subproblems. This is discussed in the next section.

IV.A.4. Approximate Solution to the Sparse Coding Model

This section presents an approximate solution to the sparse coding modes discussed above. First, the objective function in equation (1) is written in matrix form. In this section, $\vec{\theta}^{(i)}$ denotes the $i^{th}$ column vector in Θ, $\vec{x}^{(i)}$ is used to denote the $i^{th}$ row vector in X, $\vec{b}^{(i)}$ is used to denote the corresponding column vector for the $i^{th}$ post, and $b_j^{(i)}$ is used to denote the coefficient of previous post j to current post i.

Equation (1) then can be rewritten as:

$$f = \|D - X\Theta\|_F^2 + \lambda_1 \sum_i \|\vec{\theta}^{(i)}\|_1 + \lambda_2 \sum_i \|\vec{\theta}^{(i)} - \theta^{(<i)}\vec{b}^{(i)}\|_F^2 + \lambda_3 \sum_i \|\vec{b}^{(i)}\|_1$$

where $\theta^{(<i)}$ is a T×i matrix indicating the first i columns in Θ.

When Θ and X are fixed, for each $\vec{b}^{(i)}$;

$$\frac{\partial f}{\partial \vec{b}^{(i)}} = -\lambda_2 \theta^{(<i)T}(\vec{\theta}^{(i)} - \theta^{(<i)}\vec{b}^{(i)}) + \lambda_3 \text{sign}(\vec{b}^{(i)})$$

Let $\frac{\partial f}{\partial \vec{b}^{(i)}} = 0$, which yields:

$$\vec{b}^{(i)} = \frac{\text{sign}(\theta^{(<i)T}\vec{\theta}^{(i)})(\lambda_2 |\theta^{(<i)T}\vec{\theta}^{(i)}| - \lambda_3)}{\lambda_2 \theta^{(<i)T}\theta^{(<i)}}. \quad (3)$$

When b and X are fixed, for each $\vec{\theta}^{(i)}$:

$$\frac{\partial f}{\partial \vec{\theta}^{(i)}} = -\vec{x}^{(i)T}(D - X\Theta) + \lambda_1 \text{sign}(\vec{\theta}^{(i)}) + \lambda_2 \left(\vec{\theta}^{(i)} - \theta^{(<i)}\vec{b}^{(i)} - \sum_{j=i+1} b_i^{(j)}(\vec{\theta}^{(j)} - \theta^{(<j)}b^{(j)})\right)$$

Let $$x^{(-i)}\theta^{(-i)} = \sum_{k=1, k \neq i} \vec{x}^{(k)}\vec{\theta}^{(k)},$$

which yields:

$$X\Theta = \vec{x}^{(i)}\vec{\theta}^{(i)} + x^{(-i)}\theta^{(-i)}.$$

Let $\frac{\partial f}{\partial \vec{\theta}^{(i)}} = 0$, and $$G = \vec{x}^{(i)T}D - \vec{x}^{(i)T}x^{(-i)}\theta^{(-i)} + \lambda_2 \theta^{(<i)}\vec{b}^{(i)} + \lambda_2 \sum_{j=i+1} b_i^{(j)}(\vec{\theta}^{(j)} - b_{-i}^{(j)}\theta_{-i}^{(<j)}).$$

This yields the equation:

$$\vec{\theta}^{(i)} = \frac{\text{sign}(G)(|G| - \lambda_1)}{\vec{x}^{(i)T}\vec{x}^{(i)} + \lambda_2 + \lambda_2 \sum_{j=i+1} (b_i^{(j)})^2}. \quad (4)$$

When Θ and all $\vec{b}$ are fixed, and if it is assumed that D is the term matrix of all M threads, X can be optimized by the equation:

$$X = D^M \Theta^{-1} \quad (5).$$

At the beginning, a random initial value is assigned to X and the matrix X is normalized. Then the optimization loop is repeated for a fixed round c. In each round, first b is optimized in all threads by equation (3), then find Θ in all threads using equation (4), find X by using equation (5) in sequence and then normalizing X.

IV.B. Applications Module

The applications module 220 includes three applications that make use of the simultaneous semantic and structure model 210. This section presents the applications for the simultaneous semantic and structure model 210 presented above and given in some embodiments by equation (1). The first application takes advantage of the fact that embodiments of the simultaneous semantic and structure threaded discussion modeling system 200 and method are capable of recognizing structural information among posts. This fact allows reply relationship reconstruction. A second application uses the fact that embodiments of the simultaneous semantic and structure threaded discussion modeling system 200 and method are capable of capturing semantics. This allows the system 200 and method to perform junk identification. Finally embodiments of the simultaneous semantic and structure threaded discussion modeling system 200 and method are capable of measuring content quality. This allows experts to be identified. A core problem of finding experts is to estimate the overall quality of user-generated content. Each of these applications will now be discussed.

IV.B.1. Reply Reconstruction Module

Embodiments of the reply reconstruction module 260 can be used to reconstruct reply relationships among posts based on both their estimated semantics and structures. Intuitively, posts with reply relations have similar terms. Thus the task of finding reply relations can be converted into a text retrieval task. However, the major challenge here is that the length of each post is usually very short and there are usually few common words between two posts.

Topic similarity is more robust and interpretable by reducing high-dimensional term representation to lower-dimensional latent topics. However, only topic similarity itself may lose some detailed information. Combining topic similarity with term similarity is more efficient for short and sparse text. The idea of this application is to integrate term similarity, topic similarity, and structural similarity. The structural similarity can be seen as a lower-dimensional representation of topics. Since each individual post may only focus on one or two topics, there are still a few common topics shared by two posts. Here, the structural similarity acts as a smoother of topic similarity; and we will show its improvement in the experiments.

Mathematically, the similarity of a post j and an early post i is defined by the equation:

$$sim(i, j) = sim(\vec{d}^{(i)}, \vec{d}^{(j)}) + w_1 \cdot sim(\vec{\theta}^{(i)}, \vec{\theta}^{(j)}) + w_2 \cdot sim(\vec{b}^{(i)}, \vec{b}^{(j)}), \quad (6)$$

where the similarity in each component is the cosine value of two corresponding feature vectors.

Figure 5:
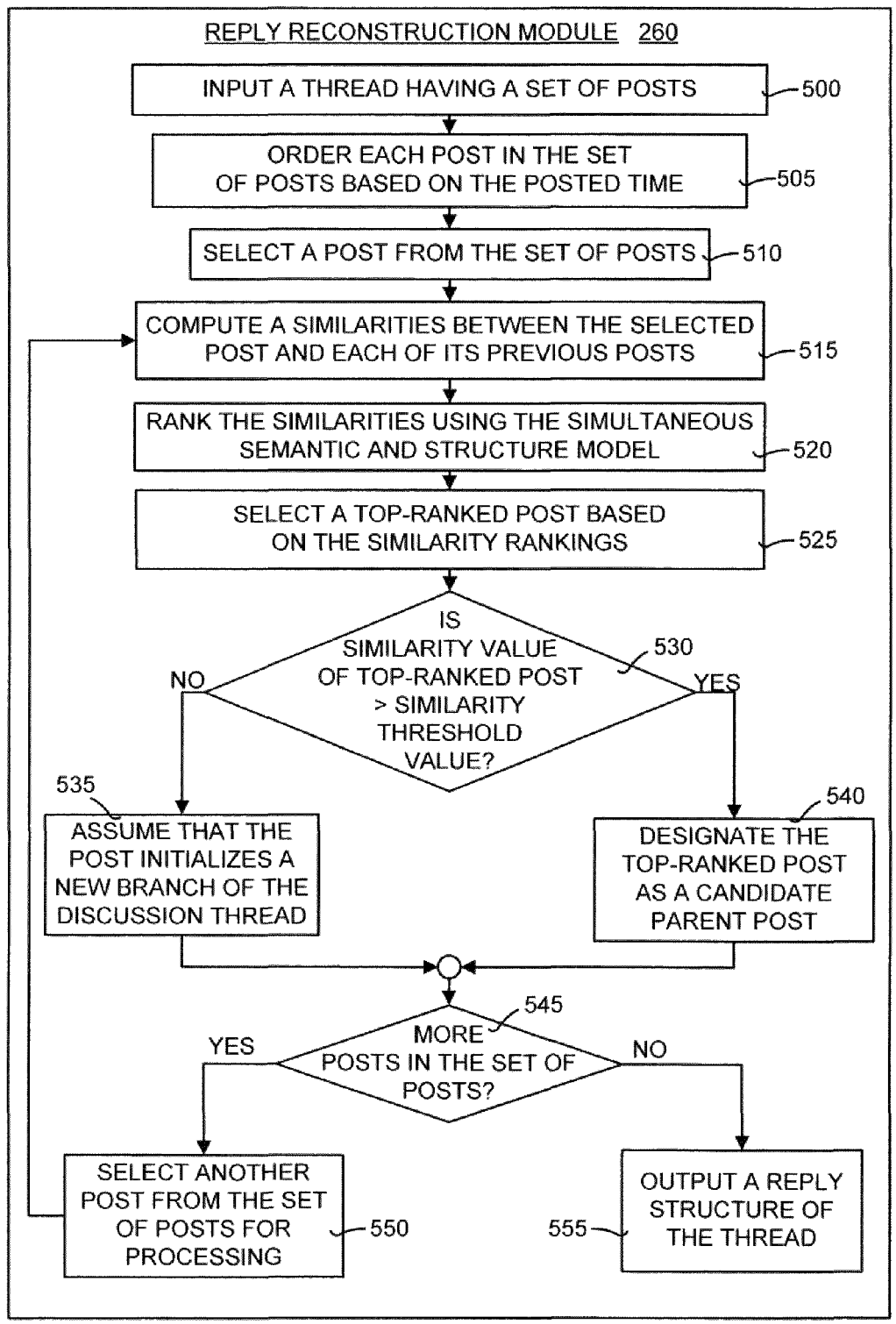
FIG. 5 is a detailed flow diagram illustrating the operation of embodiments of the reply reconstruction module shown in FIG. 2.

FIG. 5 is a detailed flow diagram illustrating the operation of embodiments of the reply reconstruction module 260 shown in FIG. 2. The operation of the module 260 begins by inputting a thread having a set of posts (box 500). Next, the module 260 orders each posts in the set of posts based on the posted time (box 505). A post is then selected from the set of posts (box 510). Next, the module 260 computes similarities between the selected post and each of its previous posts (box 515). The similarities are ranked using the simultaneous semantic and structure model 210 (box 520). A top-ranked post then is selected based on the similarity rankings (box 525).

The module 260 then determines whether a similarity value of the top-ranked post is greater than a similarity threshold value (box 530). If not, then it is assumed that the post initializes a new branch of the discussion thread (box 535). If so, then the topranked post is designated as a candidate parent post (box 540). A determination then is made as to whether there are more posts in the set of posts to be examined (box 545). If so, then another post is selected from the set of posts for processing (box 550). If not then a reply structure of a thread is output (box 555).

IV.B.2. Junk Identification Module

Embodiments of the junk identification module 270 can be used to identify junk in the threaded discussion. One issue in online discussion threads is junk. For example, referring to FIG. 1, the fourth post 140 is a typical chitchat post. Moreover, junk has become a focus of community administrators, users, and even developers, because junk content increases the cost of maintaining a clean and healthy communication environment, and distracts users from their readings.

Figure 6:
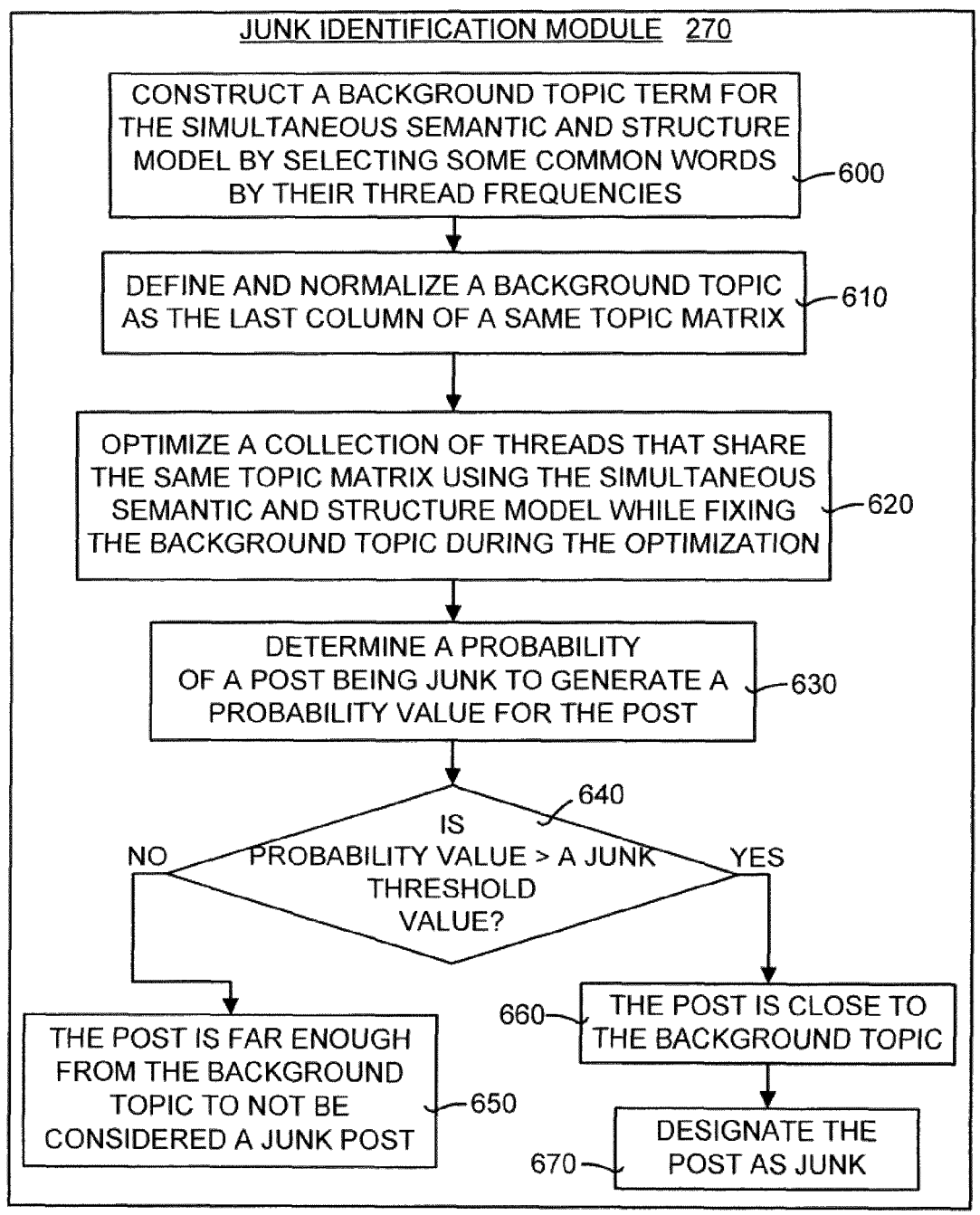
FIG. 6 is a detailed flow diagram illustrating the operation of embodiments of junk identification module shown in FIG. 2.

FIG. 6 is a detailed flow diagram illustrating the operation of embodiments of junk identification module 270 shown in FIG. 2. A discussion thread usually focuses on a very limited number of topics, while junk posts usually have different topics and act as outliers. Moreover, junk content is similar and common among various threads. In order to detect junk posts, a background topic is introduced in the simultaneous semantic and structure model. This is performed by constructing a background topic term for the simultaneous semantic and structure model 210 (box 600).

In order to construct the background topic, some common words are selected by their thread frequencies in the whole data corpus as:

$$\vec{x}_w^{(bg)} = |\{V_w : V_w \in \vec{d}^i\}|/|D| \quad (7),$$

where |D| is the total number of posts in the corpus and, $$|\{V_w : V_w \in \vec{d}^i\}|,$$

represents the number of posts where the term $V_w$ appears In equation (2), the topic matrix X is shared by all threads. Next, the background topic is defined and normalized as a last column of a same topic matrix (box 610). In particular, the background topic $\vec{x}^{(bg)}$ is defined and normalized as the last column of the same topic matrix X. The module 270 then optimizes a collection of threads that share the same topic matrix. The optimization is performed using the simultaneous semantic and structure model 210 (box 620). When optimizing equation (2), $\vec{x}^{(bg)}$ is fixed in the optimization process.

The module 270 then makes use of a criterion of junk detection based on the topic coefficients $\vec{\theta}^{(i)}$ of each post. The probability of a post i being a junk is defined as:

$$p_{junk}(i) = \frac{\vec{\theta}_{bg}^{(i)}}{\sum_t \vec{\theta}_t^{(i)}}. \quad (8)$$

Using the above equation (8), the probability of a post being junk is computed to generate a probability value for the post (box 630). The module 270 then determines whether a probability value computed above is greater than a junk threshold value (box 640). In this way, posts close to the background topic are very likely to be junk. If the probability value is not greater than the junk threshold value, then the post is far enough from the background topic to not be considered a junk post (box 650). Otherwise, the post is considered close to the background topic (box 660), and the post is designated as a junk post (box 670).

It should be noted that in the simultaneous semantic and structure model 210, the topic projection is also affected by structural constrains. This provides a more accurate description of each post. This advantage has been shown in the experiments by comparing some other models which only characterize a post according to its semantics.

IV.B.3. Expert Finding Module

Embodiments of the expert finding module 280 can be used to find experts in a threaded discussion. Online communities have become places for people to seek and share expertise. The reply relationships among posts actually construct a reply network. Studies on such a reply network indicate that reply structure in a discussion thread can help to evaluate users' expertise. In other words, posts written by experts are usually of high quality and thus attract more attention and more replies from users.

These studies were conducted on a particular site which recorded the reply relationships among posts in each discussion thread. For most community sites: however, there are few explicit reply relations. Fortunately, using the simultaneous semantic and structure model 210 and the reply reconstruction module 260 described above, the expert finding module 280 can approximately recover the implicit reply structure in a thread.

Figure 7:
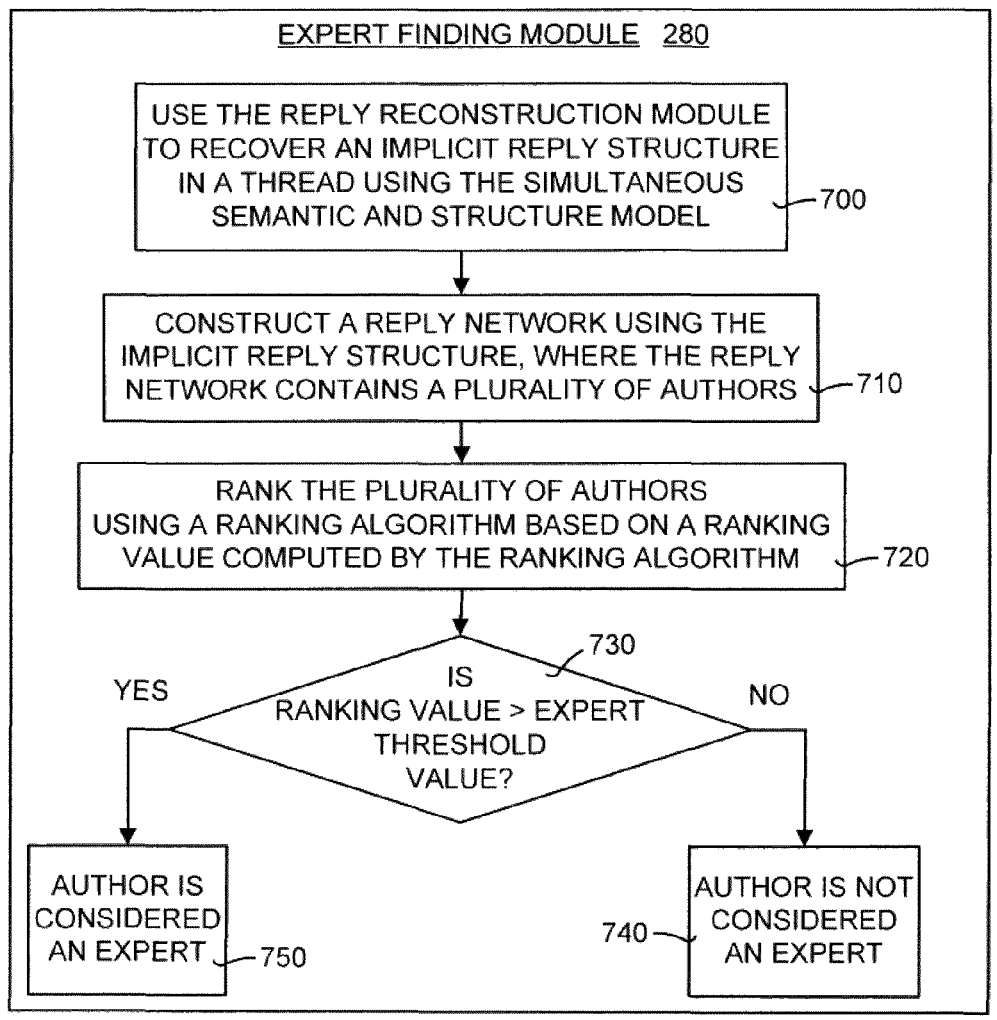
FIG. 7 is a detailed flow diagram illustrating the operation of embodiments of junk identification module shown in FIG. 2.

FIG. 7 is a detailed flow diagram illustrating the operation of embodiments of junk identification module 280 shown in FIG. 2. The method of the module 280 begins by using the reply reconstruction module 260 to recover the implicit reply structure in a thread by using the simultaneous semantic and structure model 210 (box 700). Next, a reply network is constructed using the implicit reply structure (box 710). Note that the reply network contains a plurality of authors.

In some embodiments of the module 280, a reply network G can be constructed as:

$$G=(N,E), E=\{e_{i,j}, \forall i,j, \text{user } n_i \text{ replies user } n_j\} \quad (9),$$

where N is a set of nodes of G, and each node corresponds to a user in the forum. E is the set of directed edges of G. The weight of the edge is the number of posts replied to this user.

Next, the module 280 ranks a plurality of authors using a ranking algorithm based on a ranking value computed by the ranking algorithm (box 720). A determination then is made as to whether the ranking value is greater than an expert threshold value (box 730). If so, then the author is considered an expert (box 740). Otherwise, the author is not considered an expert (box 750). In some embodiments of the module 280, the Hyperlink-Induced Topic Search (HITS) algorithm is employed as a straightforward method to rank the users. The HITS algorithm is a link analysis algorithm that rates Web pages, and is well known to those having ordinary skill in this art. Experiments have shown that the performance of the expert finding technique is even greater than that based on the original reply relations. This suggests that the expert finding technique can be extended to more web communities without explicit reply structures.

IV.C. Exemplary Example

For purposes of understanding the simultaneous semantic and structure threaded discussion modeling system 200 and method, an exemplary example is presented. It should be understood that this exemplary example is only one of many ways in which the simultaneous semantic and structure threaded discussion modeling system 200 and method can be implemented and used.

FIG. 8 is an illustration of an exemplary example of an original reply structure 800 of a sample thread. Note that a score is associated with each post. FIG. 9 illustrates a reconstructed reply structure 900 after processing of the original reply structure shown in FIG. 8 by the simultaneous semantic and structure threaded discussion modeling system 200 and method.

It should be noted that the results in FIG. 9 do not rely on the reply hints of titles. Referring to FIGS. 8 and 9, at least two observations can be made. First, as shown in FIG. 9, some of the useless posts are correctly marked as junk posts by embodiments of the simultaneous semantic and structure threaded discussion modeling system 200 and method. These junk posts designed in FIG. 9 with a bold dotted line around the posts.

Second, in original reply structure 800 shown in FIG. 8, a great deal of posts intend to reply a junk post whose content is "No one will ever need more the 640k." The reconstructed reply structure 900 shown in FIG. 9 can avoid this kind of reply relations and build its reply relation to its ancestor posts. This makes sense since some noisy data can be filtered thereby keeping the discussion thread integrated. This also has advantage in measuring the quality of post content.

V. EXEMPLARY OPERATING ENVIRONMENT

Embodiments of the simultaneous semantic and structure threaded discussion modeling system 200 and method are designed to operate in a computing environment. The following discussion is intended to provide a brief, general description of a suitable computing environment in which embodiments of the simultaneous semantic and structure threaded discussion modeling system 200 and method may be implemented.

Figure 10:
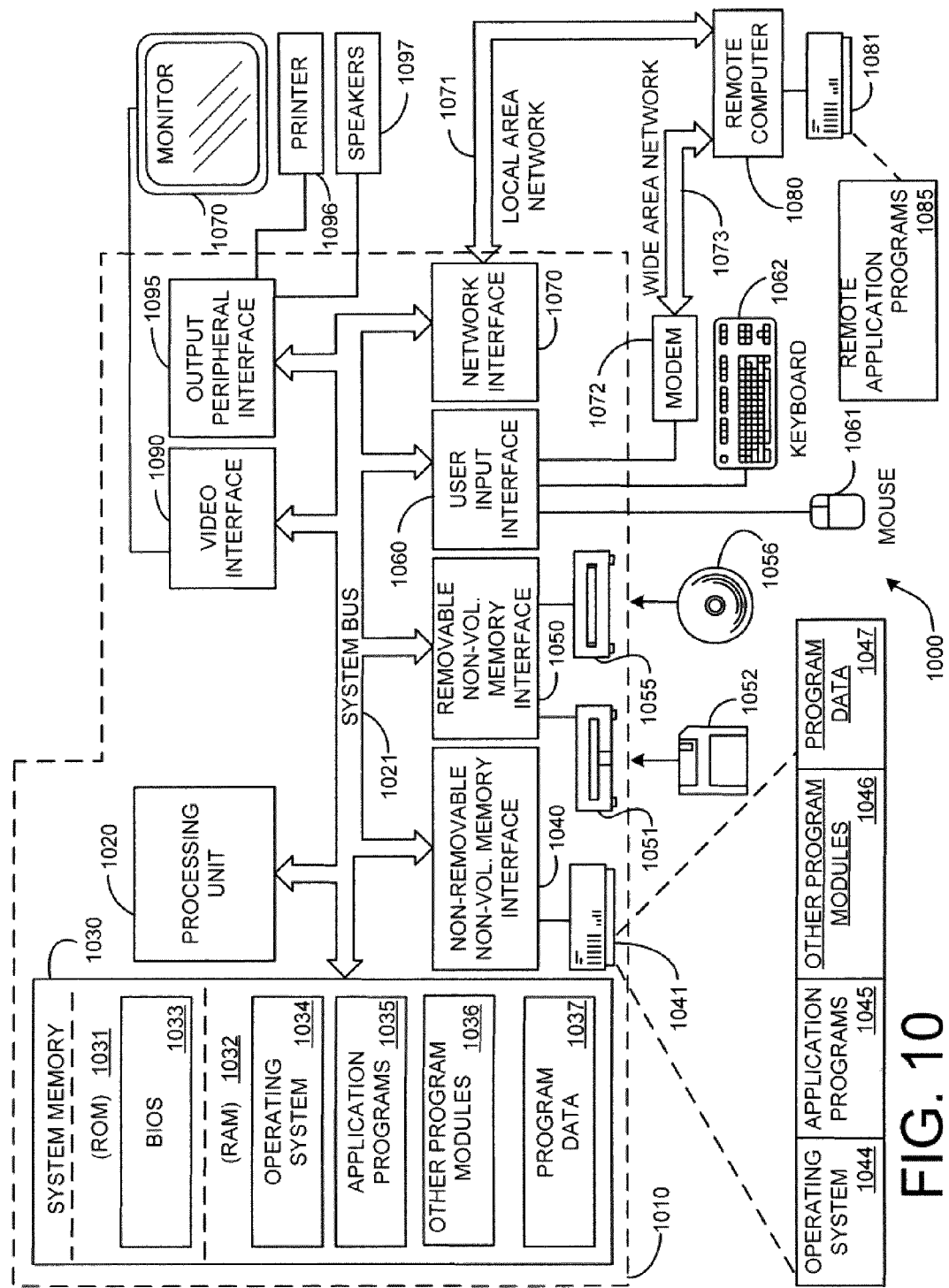
FIG. 10 illustrates an example of a suitable computing system environment in which embodiments of the simultaneous semantic and structure threaded discussion modeling system and method shown in FIGS. 2-9 may be implemented.

FIG. 10 illustrates an example of a suitable computing system environment in which embodiments of the simultaneous semantic and structure threaded discussion modeling system 200 and method shown in FIGS. 2-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment.

Embodiments of the simultaneous semantic and structure threaded discussion modeling system 200 and method are operational with numerous other general purpose or special purpose computing system environments or configurations. Examples of well known computing systems, environments, and/or configurations that may be suitable for use with embodiments of the simultaneous semantic and structure threaded discussion modeling system 200 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the simultaneous semantic and structure threaded discussion modeling system 200 and method may be described in the general context of computer-executable instructions, such as program modules, being executed by a computer. Generally, program modules include routines, programs, objects, components, data structures, etc., that perform particular tasks or implement particular abstract data types. Embodiments of the simultaneous semantic and structure threaded discussion modeling system 200 and method may also be practiced in distributed computing environments where tasks are performed by remote processing devices that are linked through a communications network. In a distributed computing environment, program modules may be located in both local and remote computer storage media including memory storage devices. With reference to FIG. 10, an exemplary system for the simultaneous semantic and structure threaded discussion modeling system 200 and method includes a general-purpose computing device in the form of a computer 1010.

Components of the computer 1010 may include, but are not limited to, a processing unit 1020 (such as a central processing unit, CPU), a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer readable media. Computer readable media can be any available media that can be accessed by the computer 1010 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1010. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within the computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036, and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media discussed above and illustrated in FIG. 10, provide storage of computer readable instructions, data structures, program modules and other data for the computer 1010. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information (or data) into the computer 1010 through input devices such as a keyboard 1062, pointing device 1061, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1020 through a user input interface 1060 that is coupled to the system bus 1021, but may be connected by other interface and bus structures, such as, for example, a parallel port, game port or a universal serial bus (USB). A monitor 1091 or other type of display device is also connected to the system bus 1021 via an interface, such as a video interface 1090. In addition to the monitor, computers may also include other peripheral output devices such as speakers 1097 and printer 1096, which may be connected through an output peripheral interface 1095.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include a local area network (LAN) 1071 and a wide area network (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the computer 1010, or portions thereof, may be stored in the remote memory storage device. By way of example, and not limitation, FIG. 10 illustrates remote application programs 1085 as residing on memory device 1081. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method implemented on a computing device for mining discussion threads, comprising:
   using the computing device to perform the following:
      generating a simultaneous semantic and structure model from semantic models and structure models so that a semantic and a structure of the discussion threads is modeled simultaneously;
      generating semantic terms for the simultaneous semantic and structure model based on the discussion threads; and
      using the simultaneous semantic and structure model in at least one application to mine the discussion threads for data.

2. The method of claim 1, further comprising using the simultaneous semantic and structure model in an application that reconstructs reply relations among posts in the discussion threads.

3. The method of claim 1, further comprising using the simultaneous semantic and structure model in an application that identifies junk posts in the discussion threads.

4. The method of claim 1, further comprising using the simultaneous semantic and structure model in an application that identifies authors in the discussion threads that can be designated as experts.

5. The method of claim 1, further comprising generating two semantic terms for the simultaneous semantic and structure model based on the discussion threads.

6. The method of claim 5, further comprising generating two structure terms for the simultaneous semantic and structure model based on the discussion threads.

7. The method of claim 6, further comprising linearly combining the two semantic terms and the two structure terms to generate the simultaneous semantic and structure model.

8. The method of claim 7, further comprising mathematically representing the simultaneous semantic and structure model by the equation:

$$f = \|D - X\Theta\|_F^2 + \lambda_1 \sum_{i=1}^{L} \|\vec{\theta}^{(i)}\|_1 + \lambda_2 \sum_{i=1}^{L} \left\|\vec{\theta}^{(i)} - \sum_{k=1}^{i-1} b_k^{(i)} \cdot \vec{\theta}^{(k)}\right\|_F^2 + \lambda_3 \sum_{i=1}^{L} \|\vec{b}^{(i)}\|_1,$$

where D is a post matrix, X is a topic matrix, Θ is a coefficient matrix, λ is an optimization parameter, θ is a topic coefficient, F is a number of topics, and b is a structural coefficient for each post.

9. A process that is implemented on a computing device for generating a model of discussion threads, comprising:
   using the computing device to perform the following process actions:
      generating a first semantic term that mathematically represents a post in the discussion threads as a combination of several topics, where each topic contains several words;
      generating a second semantic term that uses a semantic sparse constraint to mathematically represent that a post may be only related to a limited topic and the coefficients of other topics are zero;
      generating a first structure term that mathematically represents that if a post replies to some previous post of the discussion threads then the topic of a current post can be similar to a combination of topics of previous posts;
      generating a second structure term that uses a structure sparse constraint to mathematically represent that a post may be only related to a limited previous post and the coefficients of other posts are zero; and
      generating a simultaneous semantic and structure model that simultaneously models a semantic and a structure of the discussion threads by combining the first semantic term, the second semantic term, and the first structure term, and the second structure term.

10. The process of claim 9, further comprising representing the first semantic term by the equation:

$$\|D - X\Theta\|_F^2,$$

where F is a number of topics, and where, $$D = \{\vec{d}^{(1)}, \ldots, \vec{d}^{(L)}\},$$

d is a post and L is a number of posts, Θ is a coefficient matrix given by, $$\Theta = \{\vec{\theta}^{(1)} \ldots \vec{\theta}^{(L)}\},$$

where θ is a topic coefficient, and X is a topic space given by, $$X = \{\vec{x}^{(1)}, \ldots, \vec{x}^{(T)}\},$$

for a topic x and a given topic number T.

11. The process of claim 10, further comprising representing the second semantic term by the equation:

$$\|\vec{\theta}^{(i)}\|_1$$

for the $i^{th}$ post.

12. The process of claim 11, further comprising representing the first structure term by the equation:

$$\left\| \vec{\theta}^{(i)} - \sum_{k=1}^{i-1} \vec{b}_k^{(i)} \cdot \vec{\theta}^{(k)} \right\|_F^2,$$

where $\vec{b}_k^{(i)}$ is the structural coefficient between the $i^{th}$ post and the $k^{th}$ post.

13. The process of claim 12, further comprising representing the second structure term by the equation:

$$\|\vec{b}^{(i)}\|_1,$$

where b is a structural coefficient for an $i^{th}$ post.

14. The process of claim 13, further comprising generating the simultaneous semantic and structure model by linearly combining the first semantic term, the second semantic term, the first structure term, and the second structure term to generate the equation:

$$f = \|D - X\Theta\|_F^2 + \lambda_1 \sum_{i=1}^{L} \|\vec{\theta}^{(i)}\|_1 +$$

$$\lambda_2 \sum_{i=1}^{L} \left\| \vec{\theta}^{(i)} - \sum_{k=1}^{i-1} b_k^{(i)} \cdot \vec{\theta}^{(k)} \right\|_F^2 + \lambda_3 \sum_{i=1}^{L} \|\vec{b}^{(i)}\|_1,$$

where $\lambda_1$, $\lambda_2$, and $\lambda_3$, are optimization parameters.

15. A method implemented on a computing device for mining data from discussion threads having a plurality of authors of individual posts in a set of posts within the discussion threads, comprising:
using the computing device to perform the following:
computing a first semantic term that mathematically represents a post in the discussion thread as a combination of several topics, where each topic contains several words, the first semantic term given by an equation:

$$\|D - X\Theta\|_F^2,$$

where F is a number of topics, and where, $$D = \{\vec{d}^{(1)}, \ldots, \vec{d}^{(L)}\},$$

d is a post and L is a number of posts, $\Theta$ is a coefficient matrix given by, $$\Theta = \{\vec{\theta}^{(1)} \ldots \vec{\theta}^{(L)}\},$$

where $\theta$ is a topic coefficient, and X is a topic space given by, $$X = \{\vec{x}^{(1)}, \ldots, \vec{x}^{(T)}\},$$

for a topic x and a given topic number T;
computing a second semantic term that use a semantic sparse constraint to mathematically represent that a post may be only related to a limited topic and the coefficients of other topics are zero, the second semantic term given by an equation:

$$\|\vec{\theta}^{(i)}\|_1,$$

for the $i^{th}$ post;
computing a first structure term mathematically representing that if a post replies to some previous post of the discussion thread then the topic of a current post can be similar to a combination of topics of previous posts, the first structure term given by an equation:

$$\left\| \vec{\theta}^{(i)} - \sum_{k=1}^{i-1} \vec{b}_k^{(i)} \cdot \vec{\theta}^{(k)} \right\|_F^2,$$

where $\vec{b}_k^{(i)}$ is the structural coefficient between the $i^{th}$ post and the $k^{th}$ post;
computing a second structure term that uses a structure sparse constraint to mathematically represent that a post may be only related to a limited previous post and the coefficients of other posts are zero, the second structure term given by an equation:

$$\|\vec{b}^{(i)}\|_1,$$

where b is a structural coefficient for an $i^{th}$ post;
linearly combining the first semantic term, the second semantic term, the first structure term, and the second structure term to generate a simultaneous semantic and structure model that simultaneously models semantic and structure of the discussion threads, the simultaneous semantic and structure model given by an equation:

$$f = \|D - X\Theta\|_F^2 + \lambda_1 \sum_{i=1}^{L} \|\vec{\theta}^{(i)}\|_1 +$$

$$\lambda_2 \sum_{i=1}^{L} \left\| \vec{\theta}^{(i)} - \sum_{k=1}^{i-1} b_k^{(i)} \cdot \vec{\theta}^{(k)} \right\|_F^2 + \lambda_3 \sum_{i=1}^{L} \|\vec{b}^{(i)}\|_1,$$

where $\lambda_1$, $\lambda_2$, and $\lambda_3$, are optimization parameters; and
using the simultaneous semantic and structure model in at least one application to mine the discussion threads for data.

16. The method of claim 15, further comprising:
ordering each post in the set of posts based on a posted time;
selecting a post from the set of posts;
computing similarities between the selected post and each of its previous posts;
ranking the similarities using the simultaneous semantic and structure model to generate similarity rankings; and
selecting a top-ranked post based on the similarity rankings.

17. The method of claim 16, further comprising:
determining whether a similarity value of the top-ranked post is greater or equal to a similarity threshold value;
if not, then assuming that the top-ranked post initializes a new branch of the discussion threads;
if so, then designating the top-ranked post as a candidate parent post;
selecting additional posts from the set of posts until each post has been processed; and
outputting a reply structure of the discussion threads.

18. The method of claim 15, further comprising:
constructing a background topic term for the simultaneous semantic and structure model by selecting some common words by their thread frequencies;
defining and normalizing a background topic as a last column of a same topic matrix, X; and
optimizing a collection of threads that share the same topic matrix using the simultaneous semantic and structure model while fixing the background topic during the optimization.

19. The method of claim 18, further comprising:
determining a probability of a post being junk to generate a probability value for the post;
determining whether the probability value is greater than or equal to a junk threshold value;

if not, then determining that the post is far enough from the background topic so that the post is not considered a junk post; and if so, then determining that the post is close to the background topic and designating the post as a junk post.

20. The method of claim 15, further comprising:

recovering an implicit reply structure from the discussion threads using the simultaneous semantic and structure model;

constructing a reply network using the implicit reply structure, where the reply network contains a plurality of authors;

ranking the plurality of authors using a ranking technique based on a ranking value computed by the ranking technique;

determining whether the ranking value is greater than or equal to an expert threshold value;

if not, then determining that an author is not an expert; and if so, then designating the author an expert.

* * * * *